April 21, 1936.  A. C. WILSON  2,038,072

PROCESS FOR CRYSTALLIZING AND PRODUCT THEREOF

Filed March 28, 1933

Inventor
Alvin Chesley Wilson,
By
Attorney

Patented Apr. 21, 1936

2,038,072

UNITED STATES PATENT OFFICE 2,038,072

PROCESS FOR CRYSTALLIZING AND PRODUCT THEREOF

Alvin C. Wilson, Baltimore, Md., assignor, by mesne assignments, to The Davison Chemical Corporation, Baltimore, Md., a corporation of Maryland Application March 28, 1933, Serial No. 663,241

4 Claims. (Cl. 23—122)

The production of crystalline materials of exceedingly fine smooth texture, which means that the crystals thereof are extremely minute and uniform in size, is a great desideratum, and many attempts have been made without material success to obtain the same.

For example gypsum is an inexpensive substance having qualities that would make it useful in many fields were it not for the fact that its crystalline structure is relatively coarse which greatly limits its range of application. As plaster and in the decorative arts, for example, where certain of higher grades make its employment possible, it is now being widely used. But for instance as a filler in the higher grades of paint, it has been found practically useless because of its relatively coarse texture. The same is true as a filler for rubber for which much more expensive substances are employed.

Efforts have been made to refine the texture through reducing the size of the crystals by grinding and various other treatments but these have not resulted in a product having the necessary characteristics for many purposes as exemplified above.

It is also well known that crystalline materials may be formed by mixing certain substances together. Thus gypsum can be produced by mixing together lime and sulphuric acid. But gypsum thus obtained is of the same objectionable character as that found in its natural state, to wit, its crystalline structure is coarse and uneven. Therefore as its cost of production by the process is greater than that obtained by mining, its production heretofore has not been worth while.

In connection with this artificial production, the usual course has been to place sulphuric acid in a vat or container and pour into the same, while being agitated, the milk of lime. This, as already stated, has been found to result in a product of coarse uneven texture. Now it is recognized that crystals not only individually form, but that they build up or grow, and thus while a crystal as initially formed may be minute, it rapidly increases in size if conditions of the reaction are such as to permit it. This is well recognized and in certain crystallizing operations, it is the practice to introduce "seed" crystals that will be caused to grow in size. This rapid growth of crystals appears to be the case in the formation of gypsum by the method above described.

Therefore having reached this conclusion the problem that presented itself was one of securing the creation of fine crystals and preventing their growth to sizes which though relatively small are too great to make the product useful in certain of the arts for the reasons stated. Now whether the above theory is correct or not, the object has been to produce a crystalline structure in which the crystals are extremely minute and of substantially uniform size, thus widening the adaptability of the product.

A further incidental object in this connection is to utilize in the production what has heretofore been not only to a great extent a waste product from other operations, but one that is difficult to dispose of.

Referring again therefore to the example of the production of gypsum, I have discovered that if spent sulphuric acid is mixed with milk of lime in what may be termed a very restricted zone of reaction and in proportions that will substantially and almost immediately use up one of the ingredients in the reaction, a gypsum of an entirely new character is created in which the crystals are exceedingly minute and very uniform, the individual size of each crystal being approximately one micron. The product therefore is one of extraordinarily fine texture, making it useful as a substitute for more expensive fillers, as for instance in high grade paint and possibly in rubber compounds and other materials.

While of course sulphuric acid free from impurities may be employed and the process thereby simplied, I have found that spent acid, as that resulting from the manufacture of titanium pigment, may be successfully employed. As this or any like acid usually contains iron in solution, and as iron has a tendency to discolor the resultant gypsum, I find that the iron content can readily be kept in solution during the process by maintaining a slight excess of acid. This of course means that the lime is substantially exhausted in the process and the gypsum forming reaction is immediately completed, but the iron being maintained in water soluble condition can be readily washed out.

For practical or commercial purposes, it is desirable that the process be a continuing one, and therefore one of the features of the invention is apparatus, by means of which this can be accomplished.

In the accompanying drawing.

It will be understood that the embodiments of the apparatus and the hereinafter specifically disclosed process are illustrative, and may be altered and modified within the scope of the appended claims without departing from the spirit of the invention.

Figure 2:
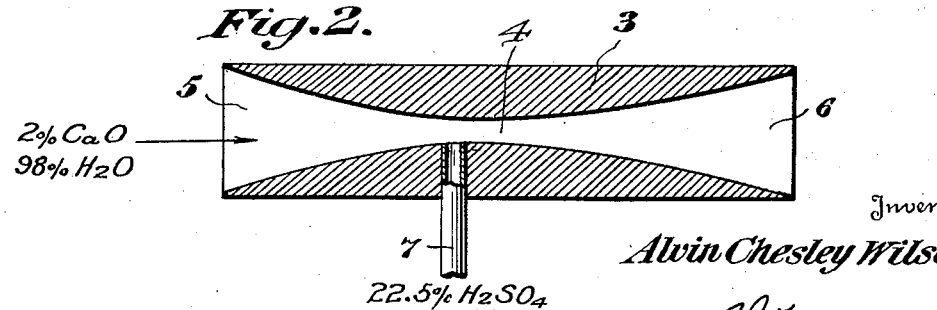
Figure 2 is a detail sectional view of one form of mixer in which the crystal forming reaction may be carried out.

One of the important features of the invention is the provision of a mixer, into which streams of material are permitted to flow and intermingle in a restricted zone, with the product flowing therefrom, or from such zone, creating an immediate reaction in the zone that is substantially complete. Thus in Figure 2 there is illustrated a mixer of the Venturi type, comprising a body or casing 3 with a passageway 4 therethrough that is constricted in the well-known manner into a throat leading from an inlet port or mouth 5 and again expanding into a discharge port 6. At the throat there is another inlet port 7.

If milk of lime is introduced into the mixer through the port 5 and sulphuric acid is introduced through the port 7, a reaction will take place in the passageway that may be made to be substantially complete therein, so that the crystalline product insofar as crystallization is concerned, appears to be substantially complete when said product discharges from the port 6. The proportions of the lime and sulphuric acid may be varied to a considerable extent without altering the crystalline character of the product. It is found that if the proportions of lime are materially increased above the given amount, the product will be a substantially solid mass, but the crystals appear to remain of substantially the same fineness.

Thus giving a concrete example and one that has been successfully carried out in laboratory experimental work, if a solution of 2% CaO and 98% $H_2O$ is passed into the port 5 at the rate of one gallon per minute (the said port having a diameter of substantially one-half inch) and an acid solution containing 22.5% $H_2SO_4$ is introduced through the port 7, at the rate of 0.150 gallon per minute, the combined solutions thus passing through the mixing zone in about 1/1000 of a second, a gypsum precipitate of a pasty or thick cream form will discharge from the port 6 and it will be found under microscopic examination that this product consists of uniform crystals, each approximating one micron in size.

The above proportions are substantially 7½ volumes of milk of lime to 1 volume of acid. If the milk of lime is reduced to 5 parts, the product becomes substantially a solid and therefore for continuous operation, as is the case in this process, the liquids would have to be forced in under pressure great enough to discharge the product. The color of the product is a "deadish" white, with no tints and the texture is extraordinarily fine. In other words, the product appears to be a new substance because of the extreme fineness of the crystals. Inasmuch as spent sulphuric acid may be successfully employed, and as such acid ordinarily contains iron sulphate $FeSO_4$ and as the iron sulphate content is a discolorant, I have further discovered that if a slight excess of acid is employed, so that a small proportion remains in the product and the lime is substantially used up in the reaction, this acid maintains the iron in water-soluble condition, and it may be readily washed out in the refining of the product.

Figure 1:
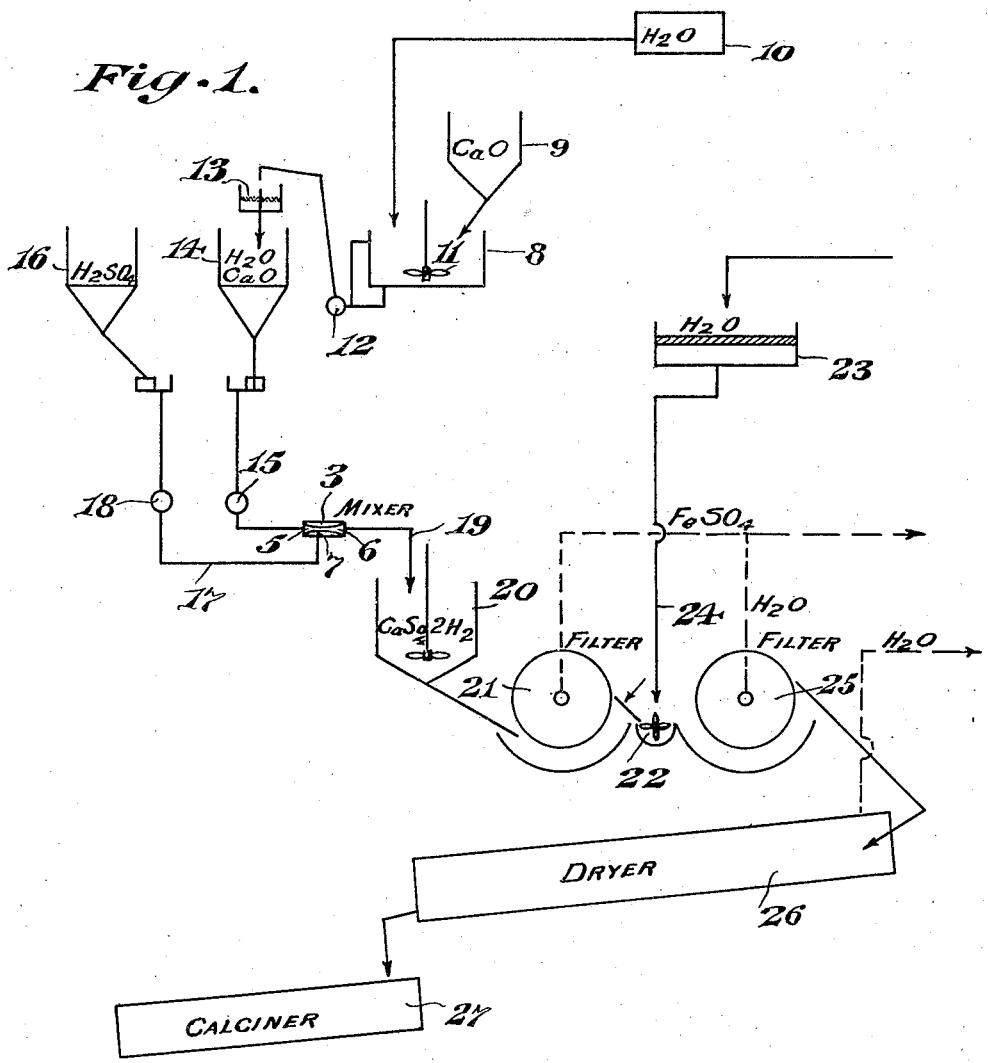
Figure 1 is a schematic view showing a form of apparatus and system in which the specific process above mentioned, may be performed.

A desirable form of apparatus for carrying out the process and securing the product is illustrated diagrammatically in Figure 1. A mixing tank 8 is provided, which receives from a container 9, the lime to be slaked. Water from a suitable reservoir 10 is delivered into the tank 8, which contains an agitator 11. Thereby the lime is slaked and from thence is forced by a suitable pump 12 through a strainer 13 to a reservoir 14. From this reservoir the milk of lime is forced by a pump 15 or flows by gravity in regulated quantities to the inlet 5 of the mixer 3.

A container 16 for the sulphuric acid has a connection 17 through a pump 18 with the inlet port 7 of the mixer.

The product is directed by a pipe 19 into a mixing tank 20, and from thence it may be conveyed to a suitable filter 21 which will extract the water and iron content. If this does not remove the impurities to a sufficient extent, the product may be delivered into a washer or mixer 22 supplied with water from a suitable source 23 by a pipe 24. From this washer or mixer the product is passed through a second filter 25 which removes the balance of the iron and most of the water. From the filter 25 the product may be passed through a suitable drier 26, and if desired may be finally calcined by being delivered to a calciner 27.

It will be understood that the above merely exemplifies one form of apparatus that may be employed. Parts of the apparatus may be dispensed with, depending on the character of the product and the amount of impurities it contains. In any event it is found that a product that in itself is believed to be novel, has been produced and one that is of such fine texture because of its crystalline qualities, so as to make it applicable to a wide range of usefulness, to which materials of this character have not heretofore been adapted.

Moreover in its specific aspect, it is found that the process uses up sulphuric acid that has been extremely difficult to dispose of because of its character and the deleterious influence it has upon its surroundings.

While there may be some question as to why the above outstanding results are obtained by the process above disclosed, it would appear that the utilization of a restricted zone in which the reaction takes place is one contributing cause to the result, and further that the operation is in the nature of a continuing one in which the reaction is immediate and complete so that individual crystals are formed and do not grow into relatively large size, resulting in the fine texture outlined above. As stated, it is found that the proportions of lime and acid may be considerably varied without materially changing the resultant product except as to its solidity. Therefore for convenient operative purposes the proportions of a volume of 7½ of lime to 1 of acid, seems most satisfactory.

What I claim is:

1. A gypsum body comprising crystals uniformly of approximately one micron in size.

2. The process of producing gypsum from sulphuric acid and milk of lime, comprising substantially completely mixing the two liquids within a time period in the order of 1/1000 of a second.

3. The process of producing gypsum which consists in uniting under material pressure two flowing streams of milk of lime and sulphuric acid, and constricting the same in a mixing chamber to cause a substantially instantaneous complete mixing and reaction under the pressure of such constriction.

4. The process of producing gypsum which consists in uniting under material pressure two flowing streams of milk of lime and spent sulphuric acid containing a substantial amount of ferrous sulphate, constricting the same in a mixing chamber to cause a substantially instantaneous complete mixing and reaction under the pressure of such constriction, thereafter washing out the ferrous sulphate from the resultant gypsum and calcining the ferrous sulphate freed gypsum.

ALVIN C. WILSON.